United States Patent
Carey et al.

(10) Patent No.: US 7,085,267 B2
(45) Date of Patent: Aug. 1, 2006

(54) METHODS, SYSTEMS AND COMPUTER PROGRAM PRODUCTS FOR TRANSLATING INTERNET PROTOCOL (IP) ADDRESSES LOCATED IN A PAYLOAD OF A PACKET

(75) Inventors: James Horan Carey, Acton, MA (US); Sergio dos Santos Costa, Cary, NC (US); Glenn Joseph Joyce, Nashua, NH (US); Douglas Evans McKenzie, Dunstable, MA (US); Rex Armistead White, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 09/844,309

(22) Filed: Apr. 27, 2001

(65) Prior Publication Data

US 2002/0159447 A1    Oct. 31, 2002

(51) Int. Cl.
*H04L 12/56* (2006.01)
(52) U.S. Cl. ............... 370/389; 370/392; 370/401; 370/475
(58) Field of Classification Search ............ 370/389, 370/392, 393
See application file for complete search history.

(56) References Cited

U.S. PATENT DOCUMENTS

| | | | |
|---|---|---|---|
| 4,933,938 A | 6/1990 | Sheehy | 370/85.13 |
| 5,343,471 A | 8/1994 | Cassagnol | 370/85.13 |
| 5,724,510 A | 3/1998 | Arndt et al. | 395/200.5 |
| 5,751,971 A | 5/1998 | Dobbins et al. | 395/200.68 |
| 5,793,763 A * | 8/1998 | Mayes et al. | 370/389 |
| 5,815,664 A | 9/1998 | Asano | 395/200.57 |
| 5,920,886 A | 7/1999 | Feldmeier | 711/108 |
| 6,006,272 A | 12/1999 | Aravamudan et al. | 709/245 |
| 6,011,795 A | 1/2000 | Varghese et al. | 370/392 |
| 6,058,431 A * | 5/2000 | Srisuresh et al. | 709/245 |
| 6,119,171 A | 9/2000 | Alkhatib | 709/245 |
| 6,535,511 B1 * | 3/2003 | Rao | 370/392 |
| 6,581,108 B1 * | 6/2003 | Denison et al. | 709/245 |
| 6,772,347 B1 * | 8/2004 | Xie et al. | 726/11 |
| 6,775,277 B1 * | 8/2004 | Li et al. | 370/389 |
| 6,963,982 B1 * | 11/2005 | Brustoloni et al. | 713/160 |

* cited by examiner

*Primary Examiner*—Chi Pham
*Assistant Examiner*—Justin M. Philpott
(74) *Attorney, Agent, or Firm*—Myers Bigel Sibley & Sajovec

(57) ABSTRACT

Methods, systems and computer program products are discussed for processing a packet. Internet Protocol (IP) addresses located in a payload of the packet are translated if a source address and/or a destination address located in a packet header has been previously translated.

44 Claims, 7 Drawing Sheets

FIG. 5

| Sets of Translation Rules | IP Address | Corresponding Normalized IP Address | |
|---|---|---|---|
| Set 1 (Customer A) | 10.10.x.x<br>92.168.x.x | 9.37.x.x<br>9.38.x.x | 270 |
| Set 2 (Customer B) | 10.10.x.x<br>92.168.x.x | 9.39.x.x<br>9.40.x.x | 271 |

METHODS, SYSTEMS AND COMPUTER PROGRAM PRODUCTS FOR TRANSLATING INTERNET PROTOCOL (IP) ADDRESSES LOCATED IN A PAYLOAD OF A PACKET

BACKGROUND OF THE INVENTION

The present invention relates to the field of communications in general and more particularly to network address translation (NAT).

NAT is a widely used technology for resolving address conflicts between two discrete Transmission Control Protocol/Internet Protocol (TCP/IP) networks. The NAT function translates the source and/or destination IP addresses in the header portion of IP packets as they cross the NAT threshold, so that packets originating in one network are mapped into unique addresses as they cross into the other network. This basic technology may be suitable for some types of network traffic, but may not be sufficient for the needs of network management platforms.

SUMMARY OF THE INVENTION

Embodiments of the present invention provide methods, systems and computer program products for processing a packet. Internet Protocol (IP) addresses located in the payload of the packet are translated if a source address and/or a destination address located in a packet header has been previously translated.

In particular embodiments of the present invention, the packet may be received at a network address translator (NAT) device. The received packet may be a Simple Network Management Protocol (SNMP) packet. It may be determined if the source address and/or the destination address located in the packet header have been previously translated to a normalized IP address. The payload of the packet may be searched for IP addresses if the source and/or destination address located in the packet header is determined to have been previously translated. The IP addresses may be translated by replacing at least one occurrence of an IP address located in the payload of the packet. The IP addresses may be identified by a unique SNMP object identifier (OID) located within a Management Information Base (MIB).

In further embodiments of the present invention the source and the destination address may be identified in the packet header. It may be determined if the source and/or destination address is present in a set of translation rules. If it is determined that the source and/or destination address is present in the set of translation rules, the source and/or destination address may have been previously translated. The set of translation rules may be a list of each IP address that has been translated and its corresponding normalized IP address. The set of translation rules may include a first set of translation rules that correspond to a first customer and a second set of translation rules that correspond to a second customer. The set of translation rules that correspond to the first customer may be unique with respect to the set of translation rules that correspond to the second customer.

In further embodiments of the present invention, an occurrence of an IP address may be identified in the payload of the packet. A corresponding normalized IP address for this IP address may be determined using the set of translation rules in which the source and/or destination address was found. Each occurrence of an IP address in the payload of the packet may be identified and its corresponding normalized IP address may be determined. IP addresses may be translated by replacing the IP address located in the payload of the packet with the corresponding normalized IP address.

In still further embodiments of the present invention, it may be determined if the source and/or destination address is present in a header translation set of translation rules. The source and/or destination address may have been previously translated if it is determined that the source and/or destination address are not present in the header translation set of translation rules. The source address and/or destination address may have been previously translated by a router or a border firewall.

In further embodiments of the present invention, the source and/or destination address located in the packet header may be translated if the source and/or destination address is found in the header translation set of translation rules. If it is determined that the source and/or destination address is present in the header translation set of translation rules, a corresponding normalized IP address for the IP addresses identified in the payload of the packet may be determined using the header translation set of translation rules.

In still further embodiments of the present invention a packet may be discarded if it is determined that the source and/or destination address is not present in a set of translation rules and the source address and the destination address are not present in the header translation set of translation rules. Alternatively, the packet may be discarded if the source and/or destination address is present in more than one set of translation rules, unless one of the sets of translation rules is the header translation set of translation rules.

BRIEF DESCRIPTION OF THE DRAWINGS

FIG. 5 is a table illustrating sets of translation rules according to embodiments of the present invention;

DETAILED DESCRIPTION OF THE INVENTION

Figure 1:
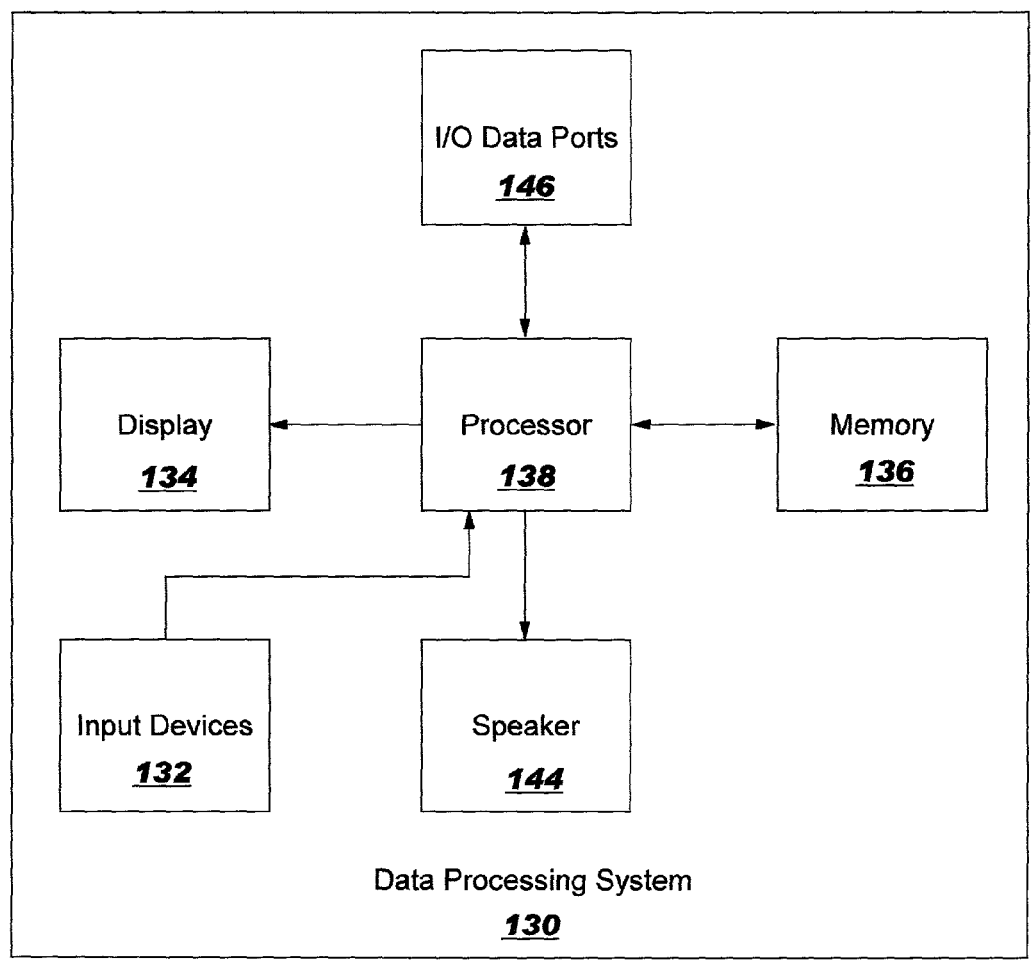
FIG. 1 is a block diagram of a data processing system according to embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit." Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As described in more detail below, the present invention provides for translation of Internet Protocol (IP) addresses located in a payload of a packet. This capability of modifying the actual payloads of, for example, specific network management messages, may enable network management across networks that have conflicting or out-of-range IP addresses. The header sensitive translator monitors packets coming through the machine and determines if a source and/or destination address has been previously translated. If it is determined that the source and/or destination address has been previously translated, the header sensitive translator replaces IP addresses located in the payload of the packet using a set of translation rules. The translation of IP addresses located in the payload of the packet typically ensures that no conflicts will occur in the destination network.

Various embodiments of the present invention will now be described with reference to FIGS. 1 through 7. FIG. 1 illustrates an exemplary embodiment of a data processing system 130 in accordance with embodiments of the present invention. A data processing system 130 typically includes input device(s) 132 such as a keyboard or keypad, a display 134, and a memory 136 that communicate with a processor 138. The data processing system 130 may further include a speaker 144, and an I/O data port(s) 146 that also communicates with the processor 138. The I/O data port 146 can be used to transfer information between the data processing system 130 and another computer system or a network, for example, the Internet. These components may be conventional components such as those used in many conventional data processing systems which may be configured to operate as described herein.

Figure 2:
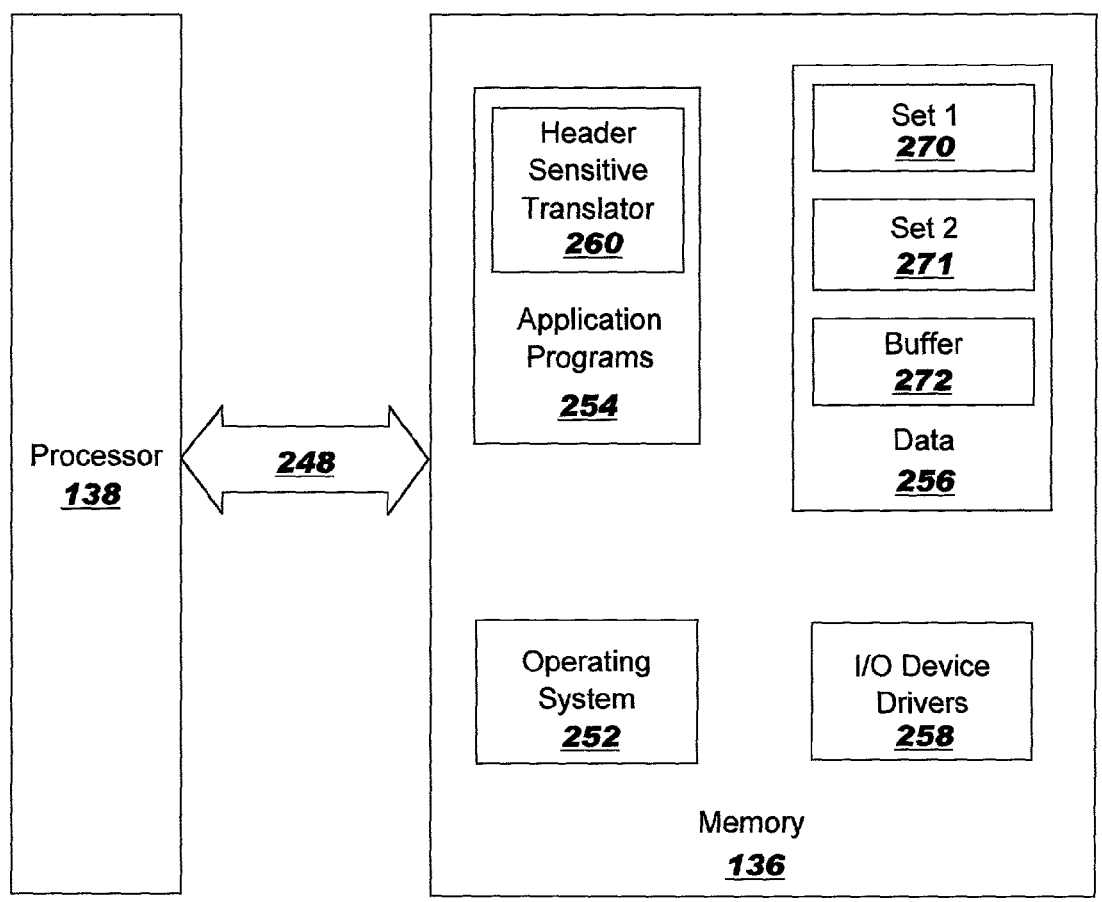
FIG. 2 is a block diagram of a data processing system according to embodiments of the present invention.

FIG. 2 is a block diagram of embodiments of a data processing system that illustrates systems, methods, and computer program products in accordance with embodiments of the present invention. The processor 138 communicates with the memory 136 via an address/data bus 248. The processor 138 can be any commercially available or custom microprocessor. The memory 136 is representative of the overall hierarchy of memory devices containing the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 2, the memory 136 may include several categories of software and data used in the data processing system 130: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y. Windows95, Windows98 or Windows2000 from Microsoft Corporation, Redmond, Wash. Unix or Linux. The I/O device drivers 258 typically include software routines accessed through the operating system 252 by the application programs 254 to communicate with devices such as the input devices 132, the display 134, the speaker 144, the I/O data port(s) 146, and certain memory 136 components. The application programs 254 are illustrative of the programs that implement the various features of the data processing system 130 and preferably include at least one application which provides the header sensitive translation aspects of embodiments of the present invention. Finally, the data 256 represents the static and dynamic data used by the application programs 254, the operating system 252, the I/O device drivers 258, and other software programs that may reside in the memory 136.

As is further seen in FIG. 2, the application programs 254 preferably include a header sensitive translator module 260. The header sensitive translator module 260 preferably carries out operations as described herein for translating Internet Protocol (IP) addresses located in a packet. Furthermore, the data portion 256 of memory 136 preferably includes one or more sets of translation rules 270 and 271 which may be used to identify IP addresses that need to be translated and the corresponding normalized IP addresses, i.e. unique IP addresses. The data portion 256 of memory 236 may also include a buffer 272 which may be used to store the packet during the translation process.

While the present invention is illustrated, for example, with reference to a header sensitive translator module 260 being an application program, as will be appreciated by those of skill in the art, other configurations may also be utilized while still benefiting from the teachings of the present invention. For example, the header sensitive translator module 260 may also be incorporated into the operating system 252 or other such logical division of the data processing system 130. Thus, the present invention should not be construed as limited to the configuration of FIG. 2 but is intended to encompass any configuration capable of carrying out the operations described herein.

Figure 3:
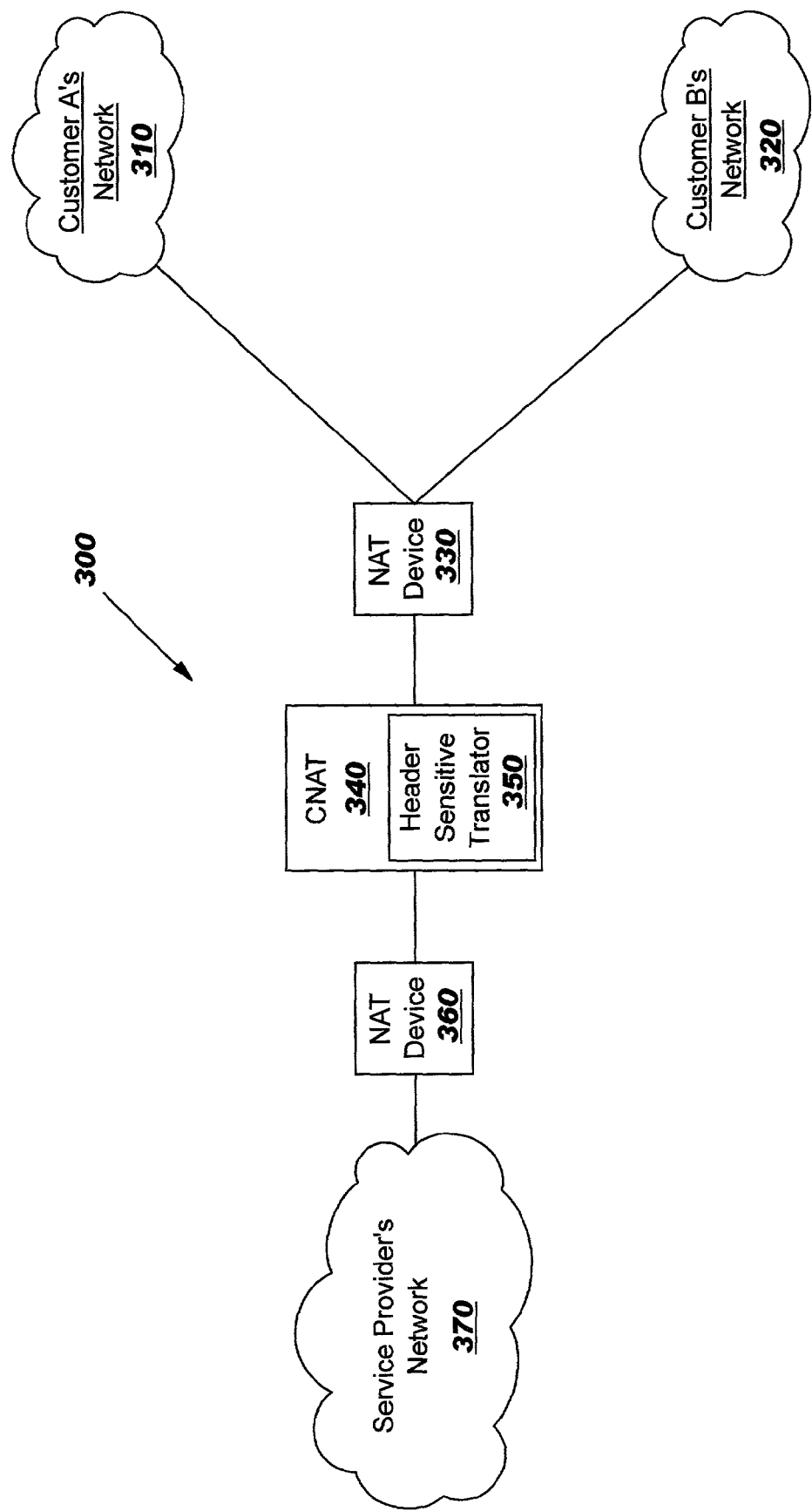
FIG. 3 is a block diagram of a basic network incorporating CNAT according to embodiments of the present invention.

A header sensitive translator may be incorporated into a Comprehensive Network Address Translator (CNAT) as shown in FIG. 3. CNAT may provide a monitoring program that may reside at the edge of the network, for example, between the service provider's network and the customer's network as shown in FIG. 3. CNAT may monitor packets coming through a network device and enable management of conflicting Internet Protocol (IP) address ranges by mapping conflicting addresses into available addresses within the service provider's network. For all packets routed through the system, CNAT may check the source and destination IP addresses and may translate any conflicting addresses to typically ensure that no conflicts occur in the destination network. In addition, for certain payloads of an IP packet, for example, Simple Network Management Protocol (SNMP) data and Internet Control Message Protocol (ICMP) data, CNAT typically scans the contents of the payload of the packet, and translates all values associated with IP address type attributes within the packets where applicable before forwarding these packets on to their destinations.

The header sensitive translator may provide CNAT with the additional capability to bypass the header translation function of CNAT discussed above. Thus, for example, if the customer's network already has a NAT-capable device, i.e. a border firewall or router, CNAT may be incorporated into the customer's network without having to change the existing NAT translation configuration of the customer's network. CNAT machines may be integrated into the network topology and may represent the only TCP/IP route from the service provider's network to the customer's network. Integrating CNAT into the network topology typically requires static routes on all routers adjacent to the CNAT node, as well as on the CNAT node itself.

Now referring to FIG. 3, a block diagram illustrating a network 300 incorporating CNAT including the header sensitive translator of embodiments of the present invention will be described. A service provider may provide network monitoring and management services to a customer or multiple customers. The IP addresses, for example, in customer A's network 310, may overlap with the IP addresses in the service provider's network 370 or with IP addresses in customer B's network 320. Thus, for packets flowing from customer A's network 310 to the service provider's network 320, the service provider may use the header sensitive translator 350 to translate IP addresses in the payload of packets received from a NAT device 330 to corresponding normalized IP addresses, i.e., unique IP addresses, to avoid conflicts in the service provider's network 370. The NAT device 330 may have already translated the source and/or destination address located in the header of the packet. Accordingly, the header sensitive translator 350 portion of CNAT 340 may be used to avoid confusing overlap of IP addresses within packets, for example, Simple Network Management Protocol (SNMP) packets or Internet Control Message Protocol (ICMP) packets, by translating IP addresses found within the payloads of packets to unique IP addresses, i.e. IP addresses not currently assigned.

When packets flow from the service provider's network 370 to, for example, customer B's network 320, the process discussed above would be reversed. For example, customer B may use the header sensitive translator 350 to translate the normalized, i.e. unique, IP addresses in the payload of packets received from a NAT device 360 back to the original IP addresses. Although FIG. 3 only shows two customer networks, the present invention is not limited to this configuration. For example, there may be three or more customer networks routed through the CNAT. Alternatively, there may only be one customer network routed through the CNAT to the service provider.

Figure 4:
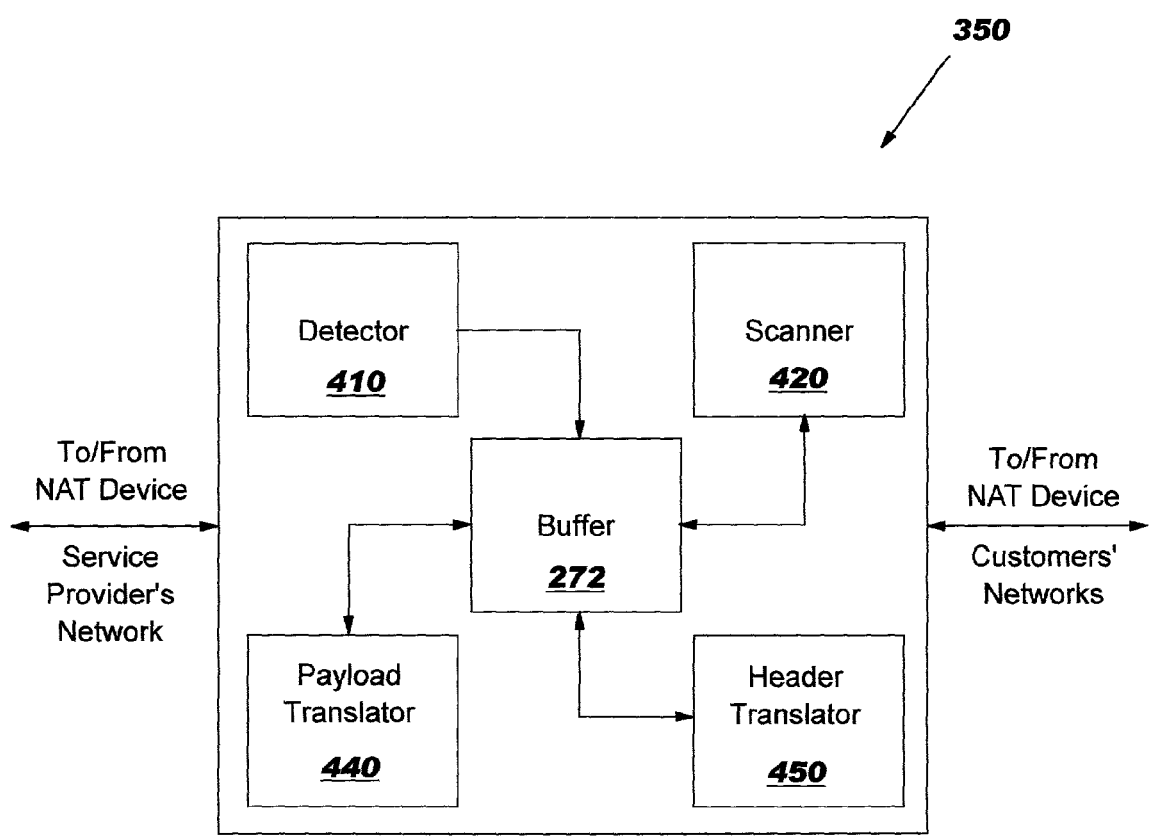
FIG. 4 is a block diagram of a header sensitive translator according to embodiments of the present invention.

Now referring to FIG. 4, a block diagram of a header sensitive translator 350 according to embodiments of the present invention will be described. A packet, for example, an SNMP packet, may be received at the header sensitive translator 350 from a first NAT device, for example, NAT device 330, and stored in a buffer 272. The header sensitive translator 350 is located within a CNAT product and thus, the header sensitive translator is part of a second NAT device. The header sensitive translator located in the second NAT device may translate Internet Protocol (IP) addresses located in a payload of the packet if at least one of the source address and the destination address has been previously translated by the first NAT device. The first NAT device may be, for example, a border firewall or a router.

A detector circuit 410 determines if a source address and/or a destination address located in the packet header has been previously translated by the first NAT device. The detector circuit 410 may determine this by first identifying the source address and the destination address located in the packet header. The detector circuit 410 may search all sets of translation rules for the identified source and destination addresses. A set of translation rules is a list of each IP address that has been translated and its corresponding normalized IP address, i.e. unique IP address. The sets of translation rules may correspond to different customers, for example, Customers A and B of FIG. 3. A set of translation rules may include one or more pairs of IP addresses, i e. an IP address and a corresponding normalized IP address. The IP addresses may overlap between sets of translation rules, but the normalized IP addresses are globally unique. Thus, each customer's set of translation rules are unique to that particular customer, i e. Customer A's set of translation rules do not overlap with Customer B's set of translation rules and so on. FIG. 5 depicts two exemplary sets of translation rules for Customer A and Customer B and will be discussed in detail below.

The set of translation rules may be defined for each NAT device when CNAT is configured. Each set may be defined in a CNAT configuration database. A set 0 or "header translation" set of translation rules is used for standard translation entries. For packets fitting the translation rules defined in the set 0 set of translation rules, the header sensitive translator may translate the source and/or destination address located in the header and any IP addresses located in the payload as discussed below.

If the detector circuit 410 determines that the source and/or destination address is found in one of the sets of translation rules, the detector circuit 410 determines if the set is the set 0 set of translation rules. The presence of the source and/or destination address in the set 0 set of translation rules indicates that the packet header has not been previously translated. The presence of the source and/or destination address in a set of translation rules other than the set 0 set of translation rules indicates that the header has been previously translated by the first NAT device to a unique IP address.

Optionally, the detector circuit 410 may discard the packet if the packet appears to be defective. For example, if neither the source nor the destination address is present in any of the sets of translation rules including the set 0 set of translation rules, the packet may be discarded. Alternatively, the detector circuit 410 may forward the packet if neither the source nor the destination address is present in any of the sets of translation rules including the set 0 set of translation rules. Furthermore, if the source and/or destination address is present in multiple sets of translation rules other than the set 0 set of translation rules, the packet may also be discarded.

Once it is determined that the source and/or destination address has been previously translated by the first NAT device, i.e. the source and/or destination address is present in one of the sets of translation rules other than the set 0 set of translation rules, a scanner circuit 420 searches the payload of the packet for all IP addresses. The scanner circuit 420 may identify a first occurrence of an IP address in the payload of the packet. The capability to translate IP addresses found within the packets typically requires the proper identification of the IP addresses that need to be translated and the location of the IP addresses in the packet.

CNAT may use a list of SNMP Object Identifiers (OIDs) to identify an IP address and its location. An SNMP OID is an administratively assigned name of an object which specifies the object type. The OID is a sequence of integers and each of these integers has an assigned significance. The SNMP object identifier is typically located within a Management Information Base (MIB). For example, in a MIB file the object identifier might be 1.3.6.1.2.1.4.20.1.1.IP address. Thus, the IP address begins at the eleventh digit of the OID. *Methods, Systems and Computer Program Products for Determining Simple Network Management Protocol (SNMP) Object Identifiers in a Management Information Base (MIB) File* are discussed in U.S. patent application Ser. No. 09/768,086 filed Jan. 23, 2001 and assigned to assignee of the present invention, the disclosure of which is incorporated herein by reference.

Once the first occurrence of an IP address is identified, the scanner circuit 420 may use the set of translation rules that the source and/or destination address was found in to identify the corresponding normalized IP address. A payload translator circuit 440 may then translate the occurrence of the IP address by replacing the IP address located in the payload of the packet with the corresponding normalized IP address. The scanner circuit 420 may identify each occurrence of an IP address located in the payload of the packet and find the corresponding normalized IP address for each identified IP address. Furthermore, the payload translator circuit 440 may continue to translate each occurrence of an IP address located in the payload of the packet by replacing the IP address with the corresponding normalized IP address.

The header sensitive translator 350 may further include a header translator circuit 450 specifically for networks that are directly connected to the second NAT device and do not connect through a first NAT device, i.e. those networks that do not already have a NAT-capable device, i. e. a border firewall or router. The header translator circuit 450 may translate the source and/or the destination address located in the packet header if the detector circuit 410 determines that the source and/or the destination address is present in the set 0 set of translation rules as discussed above. If the source and/or destination address is present in the set 0 set of translation rules, the scanner circuit 420 may use the set 0 set of translation rules to determine the corresponding normalized IP addresses for each occurrence of an IP address for this particular packet.

Now referring to FIG. 5, a table illustrating exemplary sets of translation rules according to embodiments of the present invention will be used to illustrate the functionality of the header sensitive translator discussed above. Although only two sets of translation rules are shown in FIG. 5, many more sets may be employed. Furthermore, each set of translation rules may contain more than two pair, i.e. an IP address and its corresponding normalized IP address, of IP addresses. Set 0 is not shown in FIG. 5 because, as discussed above, set 0 contains a set of translation rules used for header translation entries.

While FIG. 5 is illustrated as having sets of translation rules, IP addresses and corresponding normalized IP addresses, the table may also include network masks. Such network masks may be utilized in the determination of whether an address is present in the table. For example, in the address 10.10.x.x, the x's may refer to a network mask value of 0 such that any value in the positions occupied by the x's would be considered a match. Accordingly, the table of FIG. 5 is provided for illustrative purposes only, and, therefore, the present invention should not be construed as limited to table structures as seen in FIG. 5.

A packet, for example, an SNMP packet is received at the header sensitive translator 350 and stored in the buffer 272. The detector circuit 410 identifies the source and destination addresses located in the header of the packet. Assuming the source address is identified as 9.40.x.x by the detector circuit, the detector circuit 410 will search for this particular IP address in every set of translation rules, in this case sets 1 and 2. In this example, the detector circuit 410 would determine that the IP address 9.40.x.x is in set 2 271 which belongs to customer B.

The scanner circuit 420 identifies the first occurrence of an IP address found in the payload of the packet using a unique SNMP object identifier (OID) located within a Management Information Base (MIB) as discussed above. Once the source address is determined to belong to set 2, the payload is searched for all of the IP addresses in set 2. Thus, the scanner circuit 420 in this example will search for IP addresses 10.10.x.x and 92.168.x.x in the payload of the packet. Once the scanner circuit 420 identifies the first occurrence of one of these IP addresses in the payload of the packet, the payload translator circuit 440 replaces the IP address with its corresponding normalized IP address. For example, 10.10.x.x would be replaced with its corresponding normalized IP address 9.39.x.x. Similarly, 92.168.x.x would be replaced with its corresponding normalized IP address 9.40.x.x. The scanner circuit 420 will continue to identify IP addresses and the corresponding normalized IP addresses for each occurrence of either 10.10.x.x or 92.168.x.x in the payload of the packet until it reaches the end of the payload of the packet and the payload translator circuit 440 will also continue to replace each IP address with its corresponding normalized IP address.

The process would be similar if the source and/or destination address was identified to be a normalized IP address from set 1 270, for example, 9.37.x.x. It will also be understood that if the source and/or destination address were found in the set 0 set of translation rules, the header translator circuit 450 would translate the header information and the payload would be translated, as discussed above, using the set 0 set of translation rules.

When packets flow from the service provider's network 370 to, for example, customer B's network 320, the process discussed above will be reversed. For example, the customer may use the header sensitive translator 350 to translate the normalized IP addresses in the payload of the packet received from NAT device 360 back to the original IP addresses. With respect to the example above, the normalized IP addresses, 9.39.x.x. and 9.40.x.x would be replaced with original IP addresses 10.10.x.x and 92.168.x.x, respectively.

Figure 6:
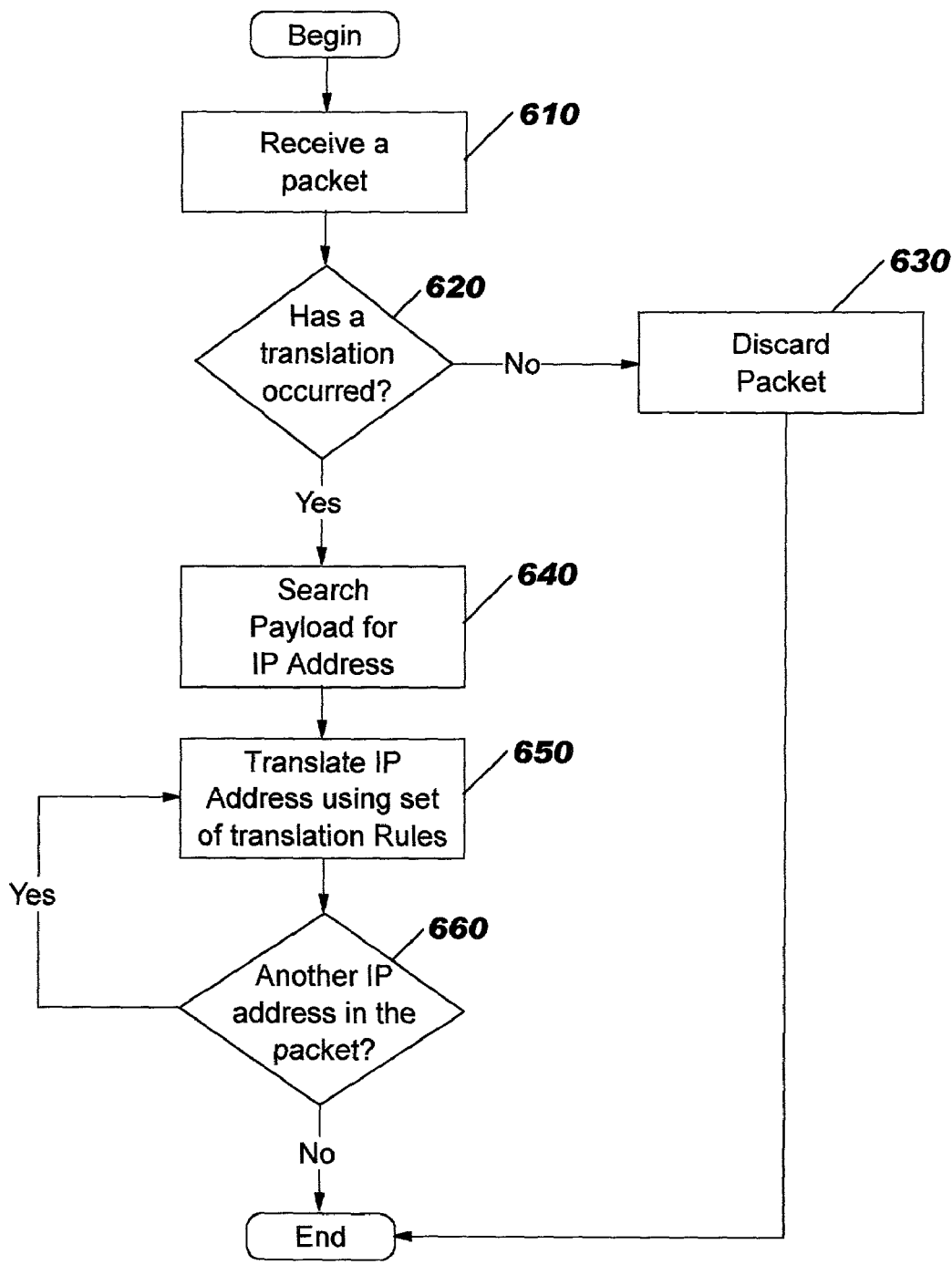
FIG. 6 is a flowchart illustrating operations of a header sensitive translator according to embodiments of the present invention.
Figure 7:
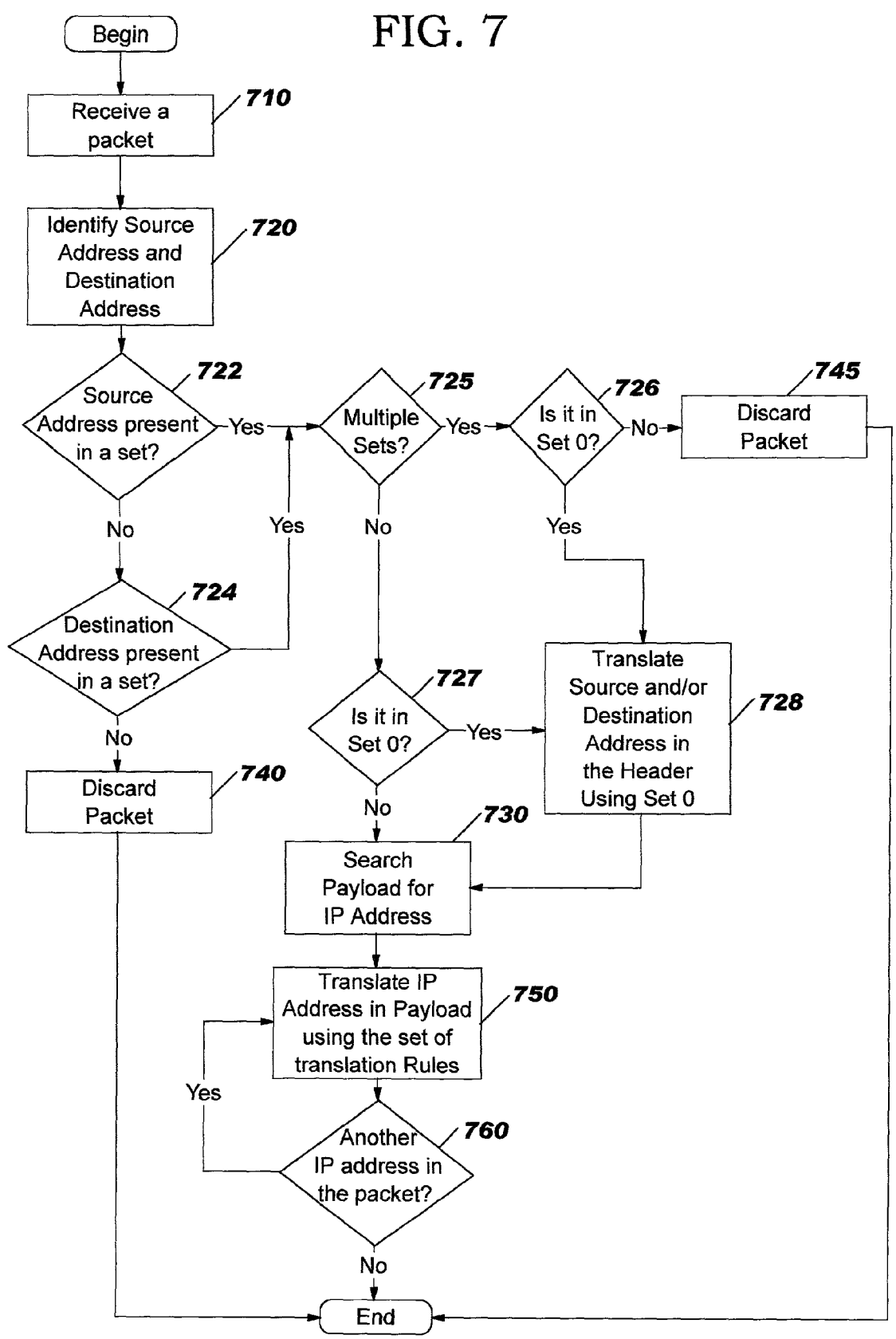
FIG. 7 is a flowchart illustrating operations of a header sensitive translator according to other embodiments of the present invention.

Embodiments of the present invention will now be described in more detail with reference to FIGS. 6 and 7 which are flowchart illustrations of operations carried out by a header sensitive translator according to embodiments of the present invention. As seen in FIG. 6, a packet, such as an SNMP packet, is received by the header sensitive translator (block 610). As discussed above, the packet may be stored in a buffer temporarily during the translation process. The header sensitive translator determines if a translation has occurred in the header of the packet, i.e. have the source and/or destination address been previously translated to a normalized IP address by another NAT device. This may be done by determining if the source and/or destination address is present in any set of translation rules (block 722). A set of translation rules is a list of each IP address that has been translated and its corresponding normalized IP address, i.e. unique IP address. The sets of translation rules may correspond to different customers. As discussed above, a set of translation rules may include one or more pairs of IP addresses, i.e. an IP address and a corresponding normalized IP address. The IP addresses may overlap between sets of translation rules, but the normalized IP addresses are globally unique. Thus, each customer's set of translation rules are unique to that particular customer, i.e. Customer A's set of translation rules do not overlap with Customer B's set of translation rules and so on. If the source and/or destination address is present in any of the sets of translation rules, the header of the packet may have been previously translated.

If it is determined that a translation has not occurred (block 620), the packet may optionally be discarded (block 630) and operations may be terminated with respect to this packet. If, on the other hand, it is determined that a translation has occurred (block 620), the payload of the packet is searched for an IP address (block 640). Each occurrence of an IP address that is found to match any of the sets of translation rules during the search of the payload may be translated (block 650). The translation may consist of replacing the original IP address with a corresponding normalized IP address or replacing a normalized IP address with a corresponding original address. The normalized IP address and/or original IP address may be found in the set of translation rules in which the source and/or destination address was found.

It is determined if another IP address in the payload of the packet has been identified (block 660). If it is determined that another IP address in the payload has been identified, operations return to block 650 and repeat until no more IP addresses are found in the payload of the packet. If it is determined that no more IP addresses are identified in the payload of the packet, operations of the header sensitive translator may terminate with respect to this packet. Note that the header IP addresses which have been translated are not translated again as this will be done by another NAT device.

Now referring to FIG. 7, a flowchart illustrating operations of other embodiments of a header sensitive translator will be described. A packet, for example, an SNMP packet, may be received at a second NAT device from a first NAT device and may be stored temporarily in a buffer (block 710). The header sensitive translator of the present invention is located within the second NAT device, such as a CNAT. The first NAT device may be, for example, a border firewall or a router.

The header sensitive translator may identify a source address and a destination address located in the packet header (block 720). It is determined if the source address is present in any set of translation rules (block 722). A set of translation rules is a list of each IP address that has been translated and its corresponding normalized IP address, i.e. unique IP address. The sets of translation rules may correspond to different customers. Each customer's set of translation rules may be unique to that particular customer, i.e. a first Customer A's set of translation rules would not overlap with a second Customer B's set of translation rules and so on.

If it is determined that the source address is not present in any of the sets of translation rules (block 722), it is determined if the destination address is present in any of the sets of translation rules (block 724). If it is determined that the destination address is not present in any of the sets of translation rules, the packet may be discarded (block 740) and operations with respect to this packet may terminate.

If it is determined that the source address or the destination address is present in any of the sets of translation rules (block 722 or 724), it is determined if the address occurs more than once in a single set of translation rules or if the address occurs in more than one set of translation rules (block 725). Alternatively, it may be determined if the address occurs multiple times during configuration. For example, when a new pair, i.e. an IP address and a corresponding normalized IP address, is added to a set of translation rules, an error message may be displayed if the address occurs more than once in a single set of translation rules or if the address occurs in more than one set of translation rules.

If the address is determined to occur multiple times (block 725), it is determined if the source address is in a set 0 set of translation rules (block 726). The set 0 set of translation rules is used for standard translation entries. If the source address is determined to be in the set 0 set of translation rules (block 726), the header sensitive translator translates the source and/or destination address in the packet header (block 728). If the source address is determined not to be in the set 0 set of translation rules (block 726), the packet may be discarded as defective and operations with respect to this packet may terminate.

The payload of the packet is searched for IP addresses (block 730). When the first IP address in the payload is identified, the set of translation rules that the source or destination address was identified to be in is searched for the corresponding normalized IP address. It will be understood that every IP address pair, i.e. an IP address and a corresponding normalized IP address, in the relevant set of translation rules is used to translate the packet. The identified IP address is then translated (replaced) using the corresponding normalized IP address found in the set of translation rules (block 750). As discussed above, the capability to translate IP addresses found within the packet typically requires the proper identification of the IP addresses that need to be translated and the location of the IP addresses in the packet.

It is determined if another IP address has been identified in the payload of the packet (block 760). If it is determined that another IP address has been identified, operations return to block 750 and repeat until it is determined that no more IP addresses have been identified.

If it is determined that no more IP addresses have been identified (block 760), translation operations may terminate with respect to this packet.

If it is determined that the address is not present in the set of translation rules multiple times (block 725), it is determined if the set that the address is present in is the set 0 set of translation rules (block 727). If the address is determined to be in the set 0 set of translation rules, the header sensitive translator translates the source and/or destination address in the packet header (block 728) and operations continue to block 730. If it is determined that the set that the address is present in is not the set 0 set of translation rules (block 727), operations continue to block 730.

The payload of the packet is searched for IP addresses (block 730). When the first IP address in the payload is identified, the set of translation rules that the source or destination address was identified in is searched for the corresponding normalized IP address. It will be understood that every IP address pair, ie. an IP address and a corresponding normalized IP address, in the relevant set of translation rules is used to translate the packet. The identified IP address is then translated (replaced) using the corresponding normalized IP address found in the set of translation rules (block 750). As discussed above, the capability to translate IP addresses found within the packet typically requires the proper identification of the IP addresses that need to be translated and the location of the IP addresses in the packet.

It is determined if another IP address has been identified in the payload of the packet (block 760). If it is determined that another IP address has been identified, operations return to block 750 and repeat until it is determined that no more IP addresses have been identified. If it is determined that no more IP addresses have been identified (block 760), operations terminate with respect to this packet.

The flowcharts and block diagrams of FIGS. 1 through 7 illustrate the architecture, functionality, and operation of possible implementations of systems, methods and computer program products for translating IP addresses located in the payload of a packet according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of processing a packet, comprising:
   receiving a packet at a network address translator (NAT) device;
   determining if at least one of a source address and a destination address located in a packet header has been previously translated to a normalized Internet Protocol (IP) address;
   searching a payload of the packet for IP addresses if it is determined that at least one of the source address and the destination address located in the packet header has been previously translated; and
   translating IP addresses located in the payload of the packet if at least one of the source address and the destination address located in the packet header has been previously translated by replacing at least one occurrence of an IP address located in the payload of the packet,
   wherein determining if at least one of the source address and the destination address located in the packet header has been previously translated comprises:
      identifying the source address and the destination address in the packet header; and
      determining if at least one of the source address and the destination address is present in a set of translation rules;
   wherein at least one of the source address and the destination address has been previously translated if it is determined that at least one of the source address and the destination address is present in a set of translation rules; and
   wherein determining if at least one of the source address and the destination address located in the packet has been previously translated further comprises:
      determining if at least one of the source address and the destination address is present in a header translation set of translation rules if it is determined that at least one of the source address and the destination address is present in the set of translation rules;
      wherein at least one of the source address and the destination address has been previously translated if it is determined that the source address and the destination address are not present in the header translation set of translation miles.

2. A method according to claim 1, wherein searching the payload of the packet for IP addresses comprises:
   identifying an occurrence of an IP address in the payload of the packet;
   determining a corresponding normalized IP address for the occurrence of the IP address using the set of translation rules that the at least one of the source address and the destination address was determined to be present in; and
   repeating the identifying and determining for each occurrence of an IP address in the payload;
   wherein translating IP addresses comprises replacing at least one occurrence of an IP address located in the payload of the packet with the corresponding normalized IP address.

3. A method according to claim 1, further comprising:
   translating at least one of the source address and the destination address located in the packet header if it is determined that at least one of the source address and the destination address is present in the header translation set of translation rules.

4. A method according to claim 1, wherein determining a corresponding normalized IP address comprises determining a corresponding normalized IF address for the occurrence of the IP address using the header translation set of translation rules.

5. A method according to claim 1, further comprising discarding the packet if it is determined that at least one of the source address and the destination address is not present in a set of translation rules and the source address and the destination address are not present in the header translation set of translation rules.

6. A method according to claim 1, wherein the packet is a Simple Network Management Protocol (SNMP) packet.

7. A method according to claim 6, wherein each of the IP addresses are identified by a unique SNMP object identifier (OID) located within a Management Information Base (MIB).

8. A method according to claim 1, wherein the at least one of the source address and the destination address located in the packet header is previously translated by a border firewall.

9. A method according to claim 1, wherein the at least one of the source address and the destination address located in the packet header is previously translated by a router.

10. A method of processing a packet comprising:
receiving a packet at a network address translator (NAT) device;
determining if at least one of a source address and a destination address located in a packet header has been previously translated to a normalized Internet Protocol (IP) address;
searching a payload of the packet for IP addresses if it is determined that at least one of the source address and the destination address located in the packet header has been previously translated; and
translating IP addresses located in the payload of the packet if at least one of the source address and the destination address located in the packet header has been previously translated by replacing at least one occurrence of an IP address located in the payload of the packet,
wherein determining if at least one of the source address and the destination address located in the packet header has been previously translated comprises:
identifying the source address and the destination address in the packet header; and
determining if at least one of the source address and the destination address is present in a set of translation rules;
wherein at least one of the source address and the destination address has been previously translated if it is determined that at least one of the source address and the destination address is present in a set of translation rules; and
wherein determining if at least one of the source address and the destination address is present in a set of translation rules further comprises:
determining if at least one of the source address and the destination address is present in a plurality of sets of translation rules; and
discarding the packet if it is determined that at least one of the source address and the destination address is present in a plurality of sets of translation rules.

11. A method according to claim 10, wherein determining if at least one of the source address and the destination address is present in a set of translation rules further comprises:
determining if one of the plurality of sets of translation rules is the header translation set of translation rules if it is determined that at least one of the source address and the destination address is present in a plurality of sets of translation rules; and
discarding the packet if it is determined that one of the plurality of sets of translation rules is not the header translation set of translation rules.

12. A method according to claim 10, wherein the set of translation rules comprises a list of each IP address that has been translated and a corresponding normalized IP address for each IP address that has been translated.

13. A method according to claim 12, wherein the set of translation rules comprises a first set of translation rules that correspond to a first customer and a second set of translation rules that correspond to a second customer.

14. A method according to claim 13, wherein the set of translation rules that correspond to the first customer are unique with respect to the set of translation rules that correspond to the second customer.

15. A method of processing a packet, comprising:
determining if at least one of a source address and a destination address located in a packet header is present in a set of translation rules;
searching a payload of the packet far IP addresses if it is determined that at least one of a source address and a destination address is present in the set of translation rules; and
translating the IP addresses in the payload of the packet using the set of translation rules,
wherein determining if at least one of the source address and the destination address located in the packet header is present in a set of translation rules comprises:
identifying the source address and the destination address in the packet header;
scanning the set of translation rules to determine if at least one of the source address and the destination address is present in the set of translation rules; and
determining if at least one of the source address and the destination address is present in a header translation set of translation rules if it is determined that at least one of the source address and the destination address is present in the set of translation rules;
wherein at least one of the source address and the destination address has been previously translated if it is determined that at least one of the source address and the destination address is present in a set of translation rules and that the source address and the destination address are not present in the header translation set of translation rules.

16. A method according to claim 15, wherein determining if at least one of a source address and a destination address located in a packet header is present in a set of translation rules is preceded by receiving a packet at a network address translator (NAT) device.

17. A method according to claim 15, wherein translating the IP addresses comprises replacing at least one occurrence of an IP address located in the payload of the packet.

18. A method according to claim 15, wherein searching the payload of the packet for IP addresses comprises:
identifying an occurrence of an IP address in the payload of the packet;
determining a corresponding normalized IP address for the occurrence of the IP address using the set of translation rules that the at least one of the source address and the destination address was determined to be present in; and
repeating the identifying and determining for each occurrence of an IP address identified in the payload;

wherein the translating IP addresses comprises replacing at least one occurrence of an IP address located in the payload of the packet with the corresponding normalized IP address.

19. A method according to claim 15, further comprising: translating at least one of the source address and the destination address located in the packet header if it is determined that at least one of the source address and the destination address is present in the header translation set of translation rules.

20. A method according to claim 19, wherein determining a corresponding normalized IP address comprises determining a corresponding normalized IP address for the occurrence of the IP addresses using the header translation set of translation rules.

21. A method according to claim 15, further comprising discarding the packet if it is determined that at least one of the source address and the destination address is not present in a set of translation rules and the source address and the destination address are not present in the header translation set of translation rules.

22. A method according to claim 15, wherein the set of translation rules comprises a list of each IP address that has been translated and a corresponding normalized IP address for each IP address that has been translated.

23. A method according to claim 15, wherein the set of translation rules comprises a first set of translation rules that correspond to a first customer and a second set of translation rules that correspond to a second customer.

24. A method according to claim 23, wherein the set of translation rules that correspond to the first customer are unique with respect to the set of translation rules that correspond to the second customer.

25. A method according to claim 15, wherein the packet is a Simple Network Management Protocol (SNMP) packet.

26. A method according to claim 25, wherein each of the IP addresses are identified by a unique SNMP object identifier (OID) located within a Management Information Base (MIB).

27. A method according to claim 15, wherein the at least one of the source address and the destination address located in the packet header is previously translated by a border firewall.

28. A method according to claim 15, wherein the at least one of the source address and the destination address located in the packet header is previously translated by a router.

29. A method of processing a packet, comprising:
determining if at least one of a source address and a destination address located in a packet header is present in a set of translation rules;
searching a payload of the packet for IP addresses if it is determined that at least one of a source address and a destination address is present in the set of translation rules; and
translating the IP addresses in the payload of the packet using the set of translation rules,
wherein determining if at least one of the source address and the destination address is present in a set of translation rules further comprises:
determining if at least one of the source address and the destination address is present in a plurality of sets of translation rules;
determining if one of the plurality of sets of translation rules is the header translation set of translation rules if it is determined that at least one of the source address and the destination address is present in a plurality of sets of translation rules; and
discarding the packet if it is determined that at least one of the source address and the destination address is present in a plurality of sets of translation rules and that one of the plurality of sets of translation rules is not the header translation set of translation rules.

30. A system for processing a packet, comprising:
a first network address translator (NAT) device that translates at least one of a source address and a destination address located in a packet header; and
a second NAT device that translates Internet Protocol (IP) addresses located in a payload of the packet if at least one of the source address and the destination address has been previously translated by the first NAT device,
wherein the second NAT device comprises:
a detector circuit configured to determine if at least one of the source address and the destination address located in the packet header has been previously translated to a normalized ID address;
a scanner circuit configured to search the payload of the packet for IP addresses if it is determined that at least one of the source address and the destination address located in the packet header has been previously translated; and
a payload translator circuit configured to translate IP addresses by replacing at least one occurrence of an IP address located in the payload of the packet; and
wherein the detector circuit is further configured to:
identify the source address and the destination address in the packet header;
determine if at least one of the source address and the destination address is present in a set of translation rules; and
determine if at least one of the source address and the destination address is present in a header translation set of translation rules if it is determined that at least one of the source address and the destination address is present in the set of translation rules;
wherein at least one of the source address and the destination address has been translated if it is determined tat at least one of the source address and the destination address is present in a set of translation rules and that the source address and the destination address are not present in the header translation set of translation rules.

31. A system according to claim 30, wherein the scanner circuit is further configured to:
identify an occurrence of an IP addresses in the payload of the packet;
determine a corresponding normalized IP address for the occurrence of the IP addresses using the set of translation rules that the at least one of the source address and the destination address was determined to be present in; and
repeat identifying and determining for each occurrence of an IP address identified in the payload;
wherein translating IP addresses comprises replacing at least one occurrence of an IP address located in the payload of the packet with the corresponding normalized IP address.

32. A system according to claim 30, wherein the second NAT device further comprises:
a header translator circuit configured to translate at least one of the source address and the destination address Located in the packet header if it is determined that at least one of the source address and the destination address is present in the header translation set of translation rules.

33. A system according to claim 32, wherein the scanner circuit is further configured to determine a corresponding normalized IP address for the occurrence of the IP address using the header translation set of translation rules.

34. A system according to claim 30, wherein the detector circuit is further configured to discard the packet if it is determined that at least one of the source address and the destination address is not present in a set of translation rules and that the source address and the destination address are not present in the header translation set of translation rules.

35. A system according to claim 30, wherein the detector circuit is further configured to:
determine if at least one of the source address and the destination address is present in a plurality of sets of translation rules;
determine if one of the plurality of sets of translation rules is the header translation set of translation rules if it is determined that at least one of the source address and the destination address is present in a plurality of sets of translation rules; and
discarding the packet if it is determined that at least one of the source address and the destination address is present in a plurality of sets of translation rules and that one of the plurality of sets of translation rules is not the header translation set of translation rules.

36. A system according to claim 30, wherein the set of translation rules comprises a list of each IP address that has been translated and a corresponding normalized IP address for each IP address that has been translated.

37. A system according to claim 30, wherein the set of translation rules comprises a first set of translation rules that correspond to a first customer and a second set of translation rules that correspond to a second customer.

38. A system according to claim 37, wherein the set of translation rules that correspond to the first customer are unique with respect to the set of translation rules that correspond to the second customer.

39. A system according to claim 30, wherein the packet is a Simple Network Management Protocol (SNMP) packet.

40. A system according to claim 39, wherein each of the IP addresses are identified by a unique SNMP object identifier (OID) located within a Management Information Base (MIB).

41. A system according to claim 30, wherein the first NAT device comprises a border firewall.

42. A system according to claim 30, wherein the first NAT device comprises a router.

43. A system for processing a packet, comprising:
means for determining if at least one of a source address and a destination address located in a packet header has been previously translated and is present in a set of translation rules;
means for searching a payload of the packet for IP addresses if it is determined that at least one of a source address and a destination address has been previously translated and is present in the set of translation rules; and
means for translating the IP addresses in the payload of the packet using the set of translation rules,
wherein the means for determining if at least one of the source address and the destination address located in the packet header is present in a set of translation rules comprises:
means for identifying the source address and the destination address in the packet header;
means for scanning the set of translation rules to determine if at least one of the source address and the destination address is present in the set of translation rules; and
means for determining if at least one of the source address and the destination address is present in a header translation set of translation rules if it is determined that at least one of the source address and the destination address is present in the set of translation rules;
wherein at least one of the source address and the destination address has been previously translated if it is determined that at least one of the source address and the destination address is present a set of translation rules and that the source address and the destination address are not present in the header translation set of translation rules.

44. A computer program product for processing a packet, comprising:
a computer readable program medium having computer readable program code embodied therein, the computer readable program code comprising:
computer readable program code which determines if at least one of a source address and a destination address located in a packet header has been previously translated and is present in a set of translation rides;
computer readable program code which searches a payload of the packet for IP addresses if it is determined that at least one of a source address and a destination address has been previously translated and is present in the set of translation rules; and
computer readable program code that translates the IP addresses in the payload of the packet using the set of translation rules,
wherein the computer readable program code configured to determine if at least one of the source address and the destination address located in the packet header is present in a set of translation rules comprises:
computer readable program code configured to identify the source address and the destination address in the packet header;
computer readable program code configured to scan the set of translation rules to determine if at least one of the source address and the destination address is present in the set of translation rules; and
computer readable program code configured to determine if at least one of the source address and the destination address is present in a header translation set of translation rules if it is determined that at least one of the source address and the destination address is present in the set of translation rules;
wherein at least one of the source address and the destination address has been previously translated if it is determined that at least one of the source address and the destination address is present in a set of translation rules and that the source address and the destination address are not present in the header translation set of translation rules.

* * * * *

UNITED STATES PATENT AND TRADEMARK OFFICE
CERTIFICATE OF CORRECTION

PATENT NO. : 7,085,267 B2  
APPLICATION NO. : 09/844309  
DATED : August 1, 2006  
INVENTOR(S) : James Horan Carey et al.

It is certified that error appears in the above-identified patent and that said Letters Patent is hereby corrected as shown below:

Col. 12, line 41  
replace "miles"  
with --rules--.

Col. 12, line 65  
replace "IF"  
with --IP--.

Col. 14, line 21  
replace "far"  
with --for--.

Col. 16, line 18  
replace "ID"  
with --IP--.

Col. 16, line 40  
replace "tat"  
with --that--.

Col. 18, line 28  
replace "rides"  
with --rules--.

Signed and Sealed this

Fourteenth Day of November, 2006

JON W. DUDAS  
*Director of the United States Patent and Trademark Office*